US012214357B2

(12) United States Patent
Huang

(10) Patent No.: US 12,214,357 B2
(45) Date of Patent: Feb. 4, 2025

(54) HERB GRINDER

(71) Applicant: Cloudious9 Inc., Freemont, CA (US)

(72) Inventor: Richard Yao Tien Huang, Freemont, CA (US)

(*) Notice: Subject to any disclaimer, the term of this patent is extended or adjusted under 35 U.S.C. 154(b) by 309 days.

(21) Appl. No.: 17/667,203

(22) Filed: Feb. 8, 2022

(65) Prior Publication Data
US 2022/0161270 A1 May 26, 2022

Related U.S. Application Data

(63) Continuation of application No. PCT/US2020/042930, filed on Jul. 21, 2020, which is a continuation of application No. 16/538,615, filed on Aug. 12, 2019, now Pat. No. 11,203,021.

(51) Int. Cl.
*B02C 18/08* (2006.01)
*A24C 5/40* (2006.01)
*A24F 23/04* (2006.01)
*A47J 42/34* (2006.01)
*B02C 18/22* (2006.01)

(52) U.S. Cl.
CPC .............. *B02C 18/08* (2013.01); *A24C 5/40* (2013.01); *A24F 23/04* (2013.01); *A47J 42/34* (2013.01); *B02C 18/2216* (2013.01)

(58) Field of Classification Search
CPC .. A47J 42/04; A47J 42/14; A47J 42/24; A47J 42/30; A47J 42/34; A47J 42/38; A47J 42/40; A47J 42/42; A47J 42/06; A47J 42/16; A47J 42/26; A47J 42/36; A61J 7/0007; A24C 5/40; A24F 23/04
See application file for complete search history.

(56) References Cited

U.S. PATENT DOCUMENTS

| | | | |
|---|---|---|---|
| 9,565,972 B1* | 2/2017 | Ormaza | A47J 42/30 |
| 2012/0168544 A1* | 7/2012 | Chaoui | A47J 42/24 |
| | | | 241/68 |
| 2014/0319249 A1* | 10/2014 | Smith | A47J 43/25 |
| | | | 241/24.1 |
| 2015/0041423 A1* | 2/2015 | Schmertz, Jr. | B65D 83/06 |
| | | | 215/43 |

OTHER PUBLICATIONS

Awesome Town Rocks, "Sharpstone Vibrating Grinder", May 8, 2011, https://www.youtube.com/watch?v=86Yb_73-R-A (Year: 2011).*

* cited by examiner

*Primary Examiner* — Jared O Brown
(74) *Attorney, Agent, or Firm* — Olav M. Underdal; IDP Patent Services

(57) ABSTRACT

An herb grinder includes: a main body with a receiving indentation, which has a spout indentation; a cutting section with top and bottom cutting parts, a magnet, and a ferromagnetic part; a main body with a receiving indentation, which has a spout indentation, a center interior, traversal ridges, a flow blocker, an exit canal, and an exit aperture; a slidable exit lid that covers the dispensing aperture; a window, a light source, a rotatable dispensing spout assembly with a dispensing arm and a dispensing spout that is configured to connect with an empty cigarette tube; a dispensing vibrator, and a vibration button.

18 Claims, 18 Drawing Sheets

Herb Grinder (open)

Herb Grinder

Herb Grinder (open)

Herb Grinder Control System

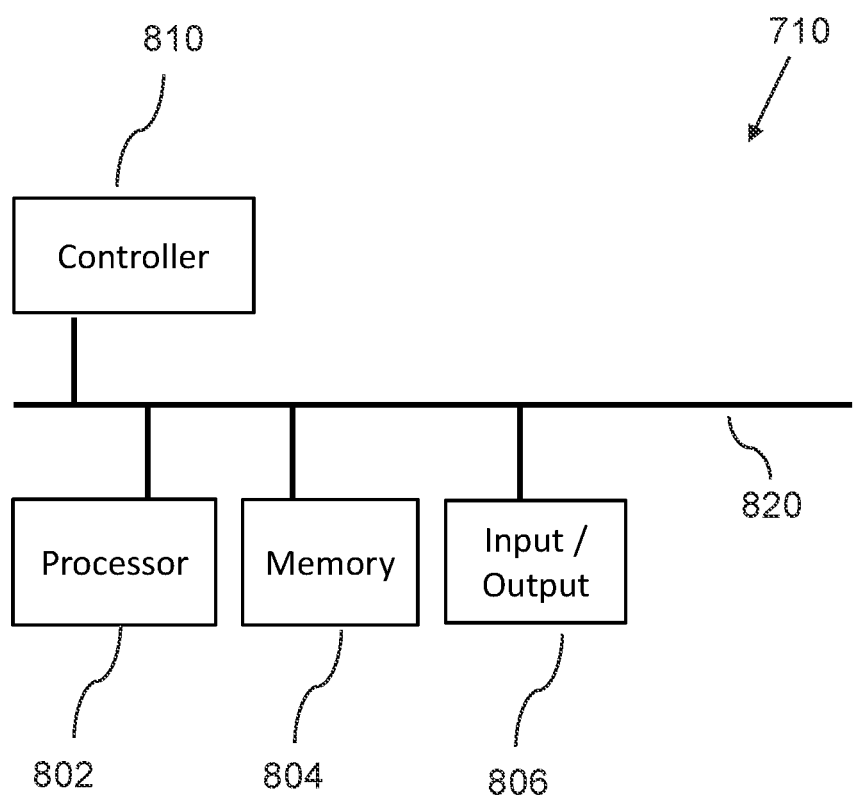

HERB GRINDER

CROSS-REFERENCE TO RELATED APPLICATIONS

This U.S. Non-Provisional Application is a Continuation of International Application No. PCT/US2020/42930, filed Jul. 21, 2020; which claims the benefit of U.S. Non-Provisional application Ser. No. 16/538,615, filed Aug. 12, 2019; both of which are hereby incorporated herein by reference in their entirety.

FIELD OF THE INVENTION

The present invention relates generally to the field of grinders for herbs, including grinders for tobacco and cannabis materials, and more particularly to methods and systems for herb grinders, which are adapted to deliver ground material into an empty pre-rolled cigarette tube.

BACKGROUND OF THE INVENTION

Herb grinders are well-known for use in preparation of smoking materials, such as cannabis and tobacco.

However, conventional herb grinders often will clog up and require cleaning of herb materials stuck in interior grinding mechanisms.

Further, conventional herb grinders do not have practical means of filling an empty cigarette tube, and therefore require combination with other tools and associated preparation tasks.

As such, considering the foregoing, it may be appreciated that there continues to be a need for novel and improved devices and methods for herb grinders.

SUMMARY OF THE INVENTION

The foregoing needs are met, to a great extent, by the present invention, wherein in aspects of this invention, enhancements are provided to the existing model of herb grinders.

In an aspect, an herb grinder can include:
a) A main body of the herb grinder, which includes a receiving indentation a bottom of the main body, wherein the receiving indentation includes a spout indentation;
b) A cutting section, which can include:
   i. a top cutting part; and
   ii. a bottom cutting part;
   such that the top cutting part can be detachably and rotatably mounted on the bottom cutting part;
   such that an herb material can be inserted in an interior of the bottom cutting part, when the top cutting part is removed;
   such that the top cutting part is configured to be rotatable when mounted on the bottom cutting part;
   such that top interlocking blades and bottom interlocking blades of respectively the top cutting part and the bottom cutting part are configured to cut the herb material into herb cuttings, when the top cutting part is rotated;
   wherein the bottom cutting part includes a floor, such that the bottom interlocking blades are mounted on an upper surface of the floor,
   wherein the floor comprises apertures, such that the herb cuttings fall through the apertures when the herb material is cut;
c) a main body, which comprises:
   i. a center interior;
   ii. an exit canal;
   iii. a dispensing aperture, which is positioned on an exterior of the herb grinder;
   such that the exit canal connects the center interior with the dispensing aperture;
   such that the herb cuttings pass through the apertures and into the center interior, such that the herb cuttings pass through the exit canal and exit via the dispensing aperture;
d) an exit lid, which can be slidable, such that the lid is configured to open and close the dispensing aperture; and
e) a rotatable dispensing spout assembly, which comprises:
   i. a dispensing arm, which is hingedly connected to a lower end of a main body of the herb grinder;
   ii. a dispensing spout, which is connected to an outer end of the dispensing arm, wherein the dispensing spout has a spout aperture;
   wherein the rotatable dispensing spout assembly is configured to be rotatable to a closed position, wherein the rotatable dispensing spout assembly fits into the receiving indentation on the bottom of the main body of the herb grinder, wherein the exit lid can be closed to avoid spillage of herb cuttings in the center interior;
   wherein the rotatable dispensing spout assembly is configured to be rotatable to an open position, wherein the dispensing arm is rotated to a vertical position aligned with a vertical side of the main body of the herb grinder, such that the spout aperture is aligned with the dispensing aperture, such that the herb cuttings pass through the spout aperture and exit the herb grinder.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 8 is a schematic diagram illustrating an herb grinder control unit, according to an embodiment of the invention.

DETAILED DESCRIPTION

Figure 1A:
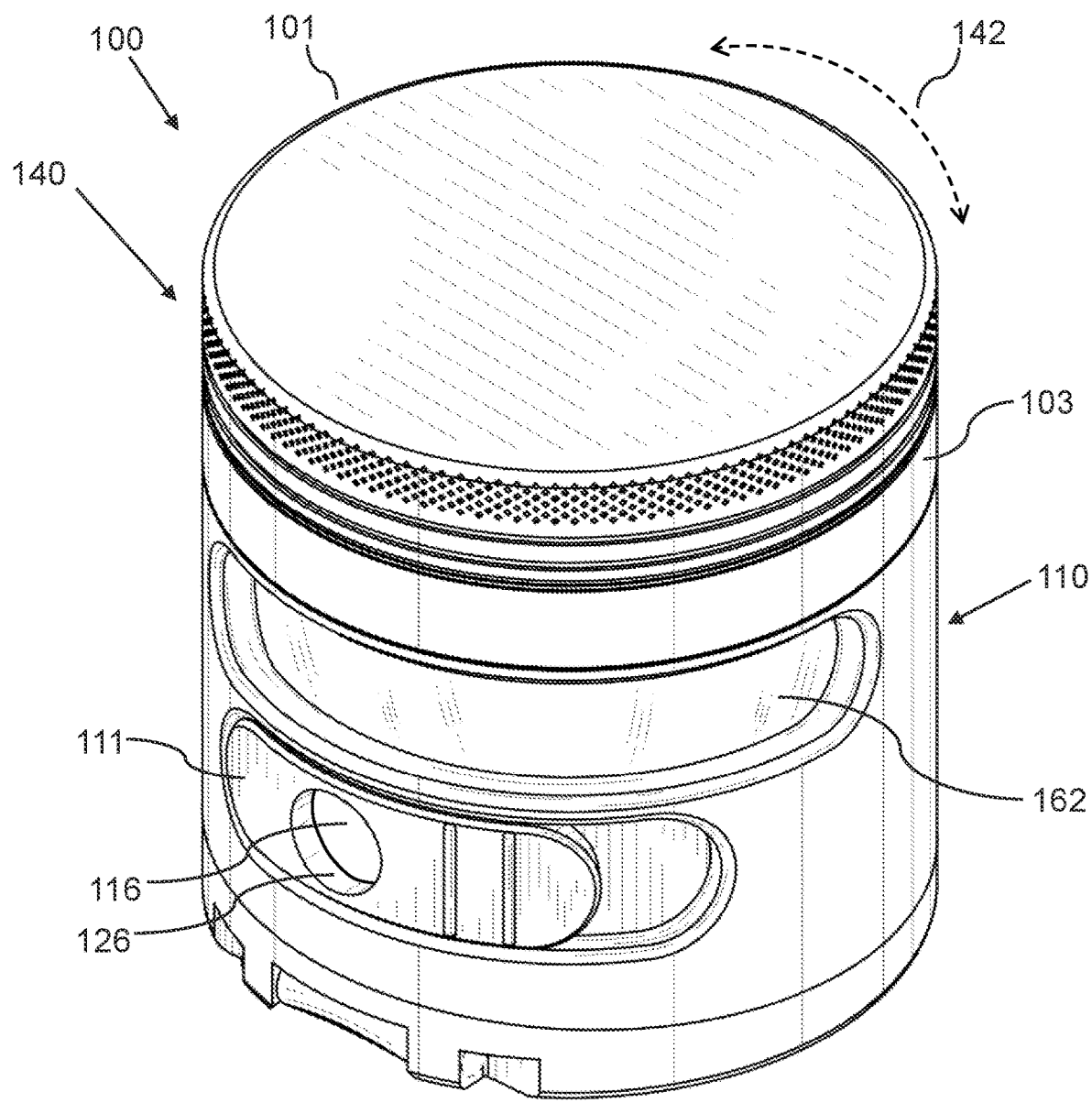
FIG. 1A is a top perspective view of an herb grinder with a dispensing spout in a closed configuration, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of an herb grinder 100 with reference to FIG. 1, in such manner that like reference numerals refer to like components throughout; a convention that we shall employ for the remainder of this specification.

Figure 1B:
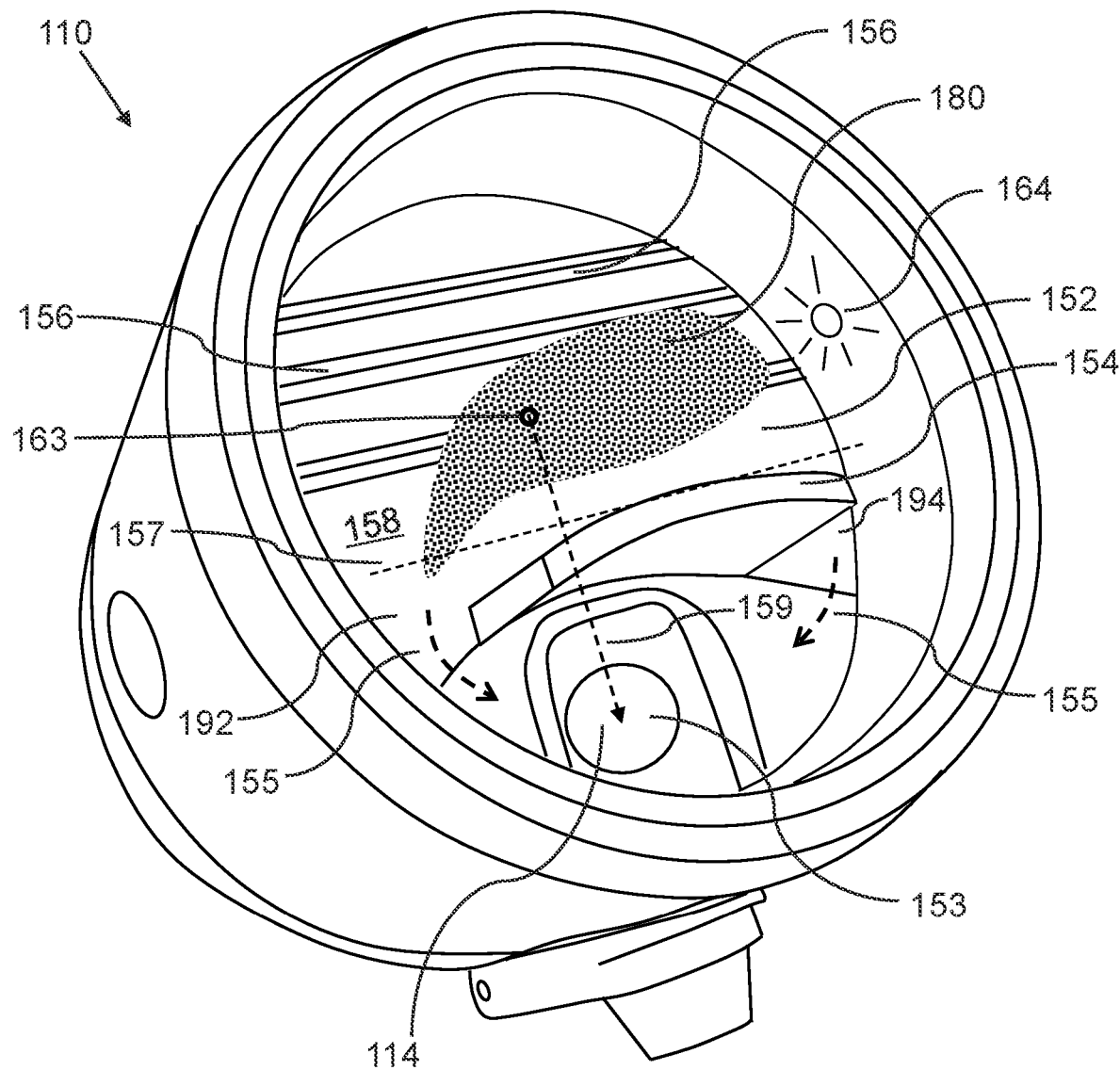
FIG. 1B is a top perspective view of an herb grinder with a top cutting part removed, according to an embodiment of the invention.
Figure 1C:
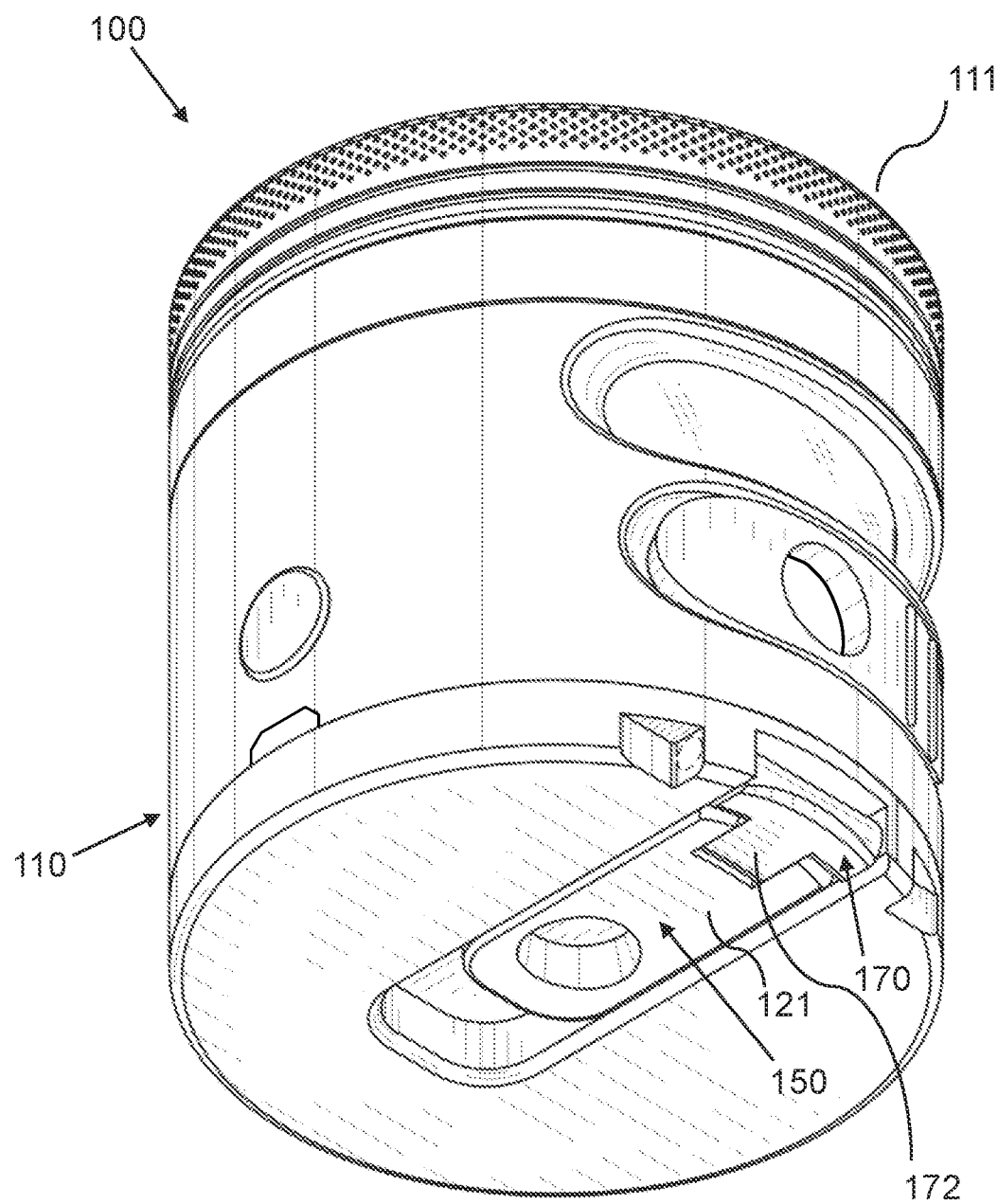
FIG. 1C is a bottom perspective view of an herb grinder with a dispensing spout in a closed configuration, according to an embodiment of the invention.
Figure 1D:
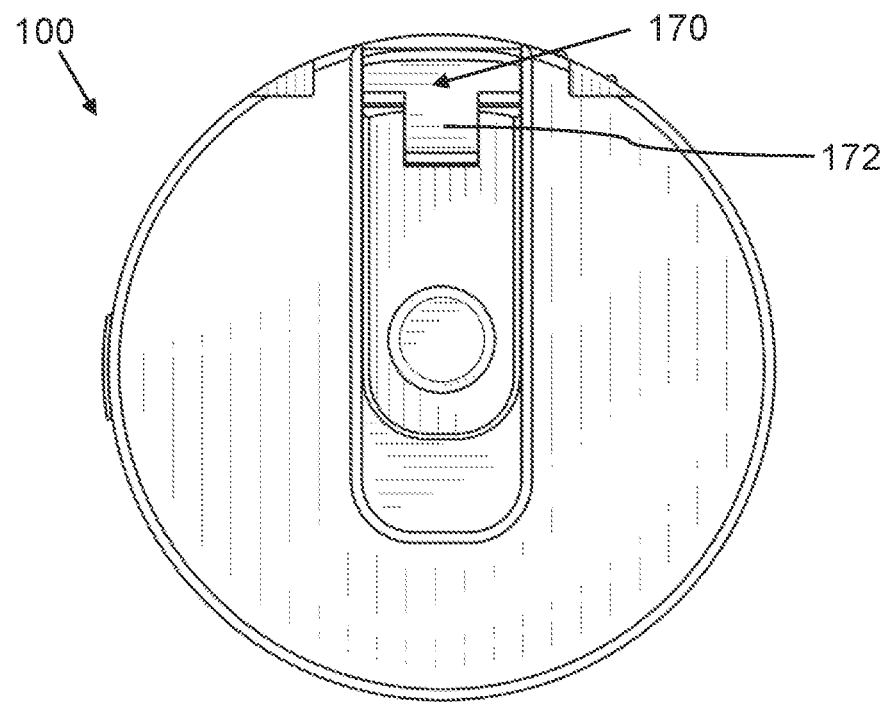
FIG. 1D is a top view of an herb grinder with a dispensing spout in a closed configuration, according to an embodiment of the invention.
Figure 1E:
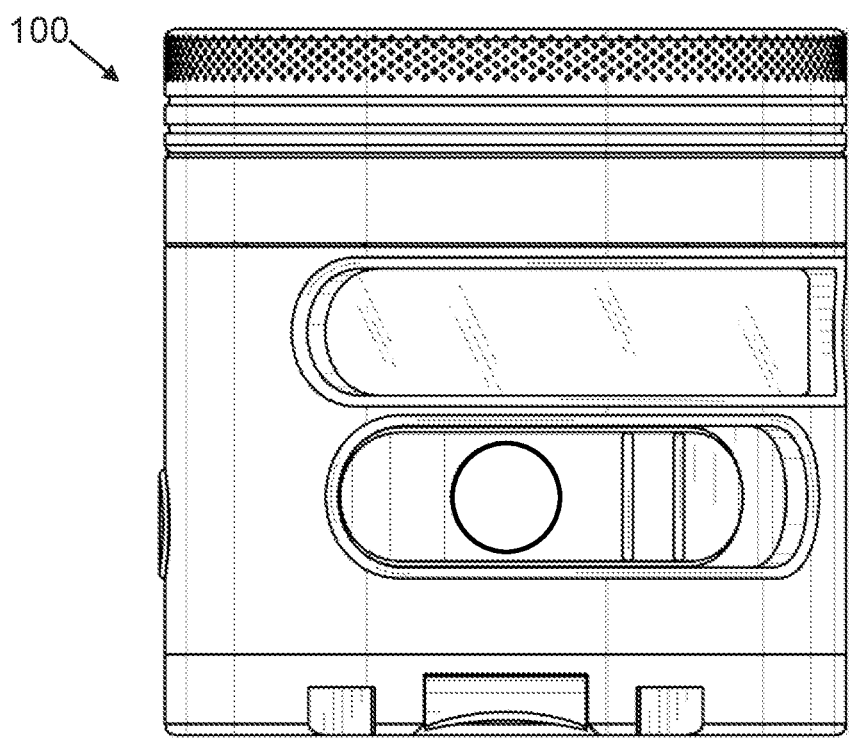
FIG. 1E is a side view of an herb grinder with a dispensing spout in a closed configuration, according to an embodiment of the invention.
Figure 2A:
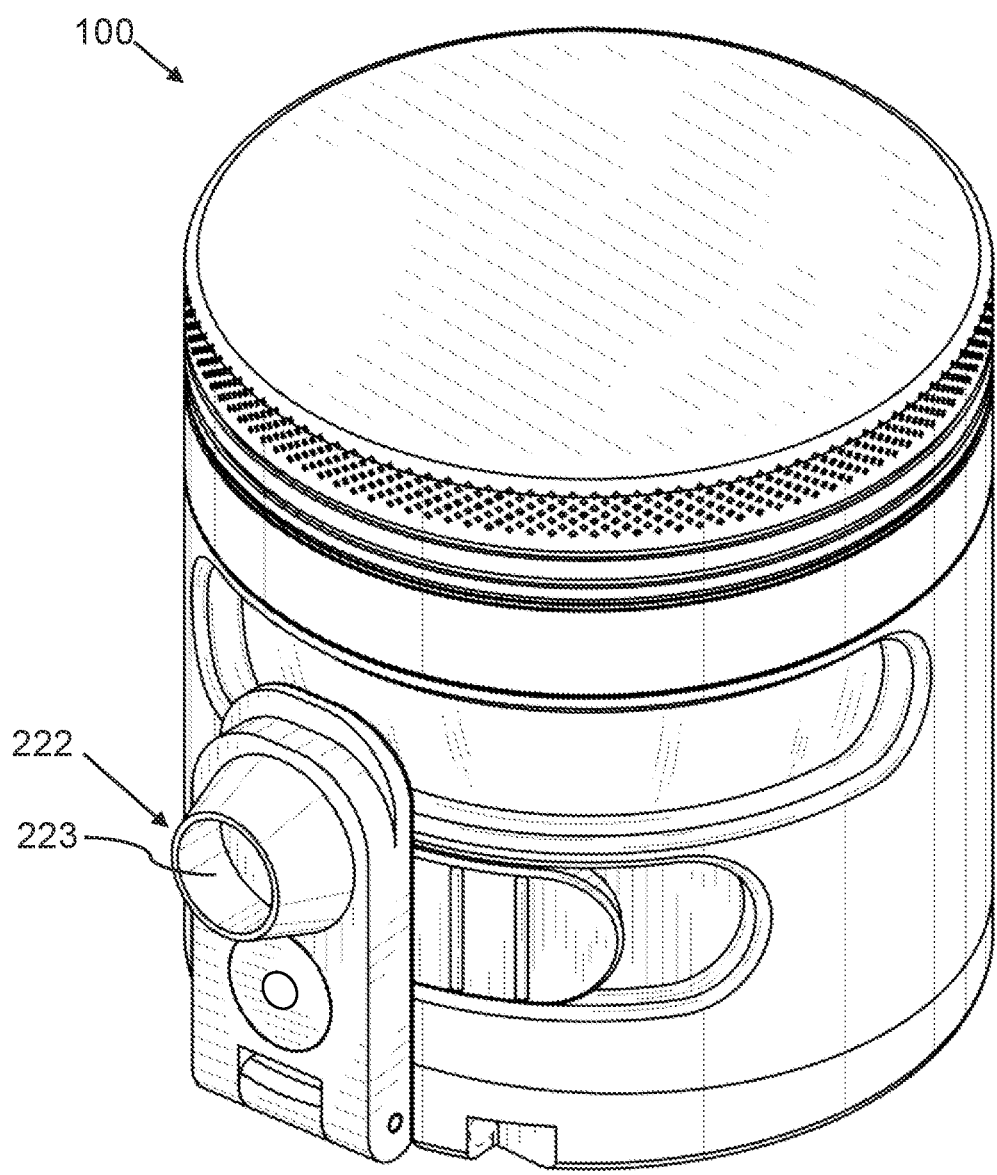
FIG. 2A is a top perspective view of an herb grinder with a dispensing spout in an open configuration, according to an embodiment of the invention.
Figure 2B:
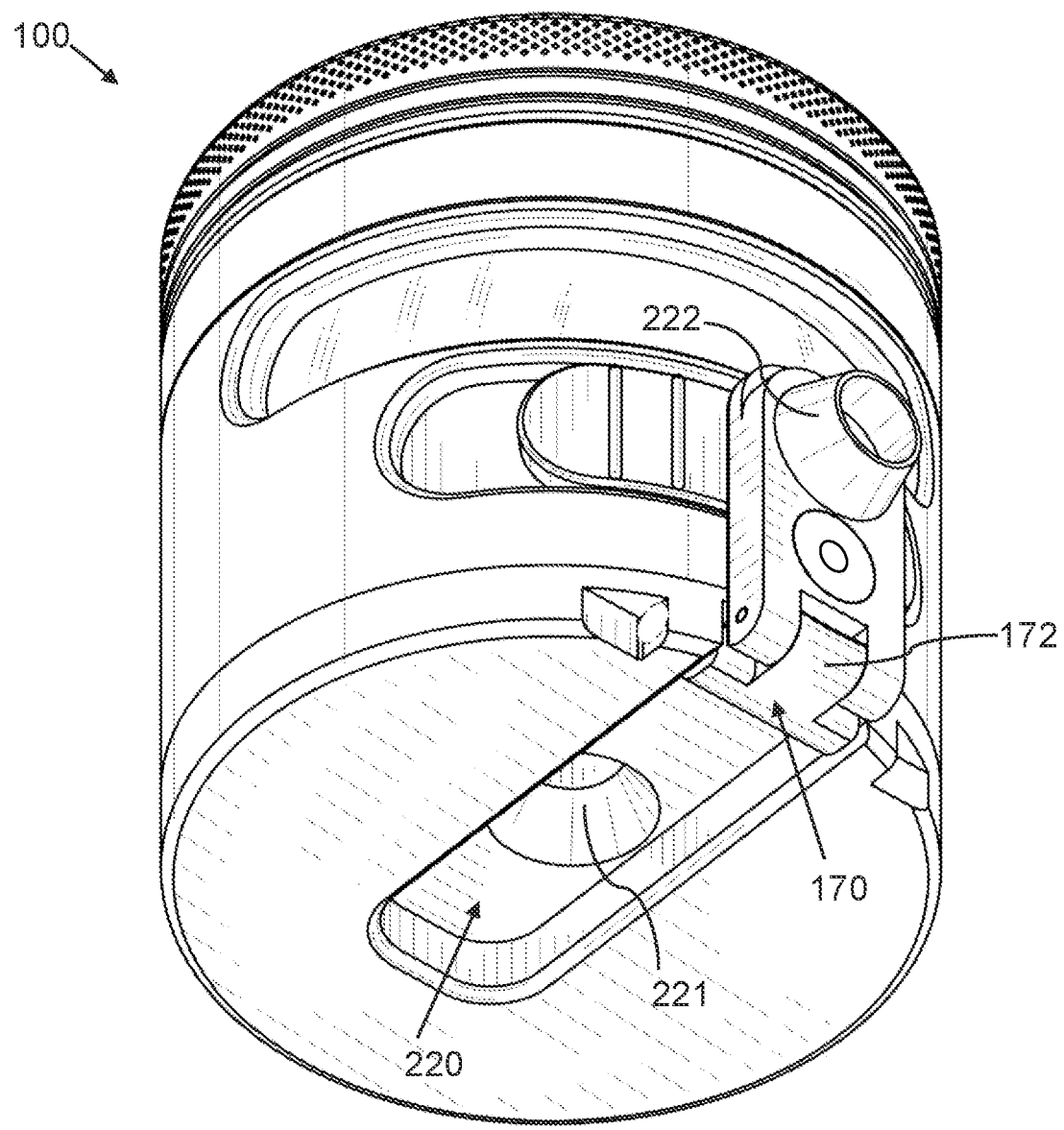
FIG. 2B is a bottom perspective view of an herb grinder with a dispensing spout in an open configuration, according to an embodiment of the invention.
Figure 2C:
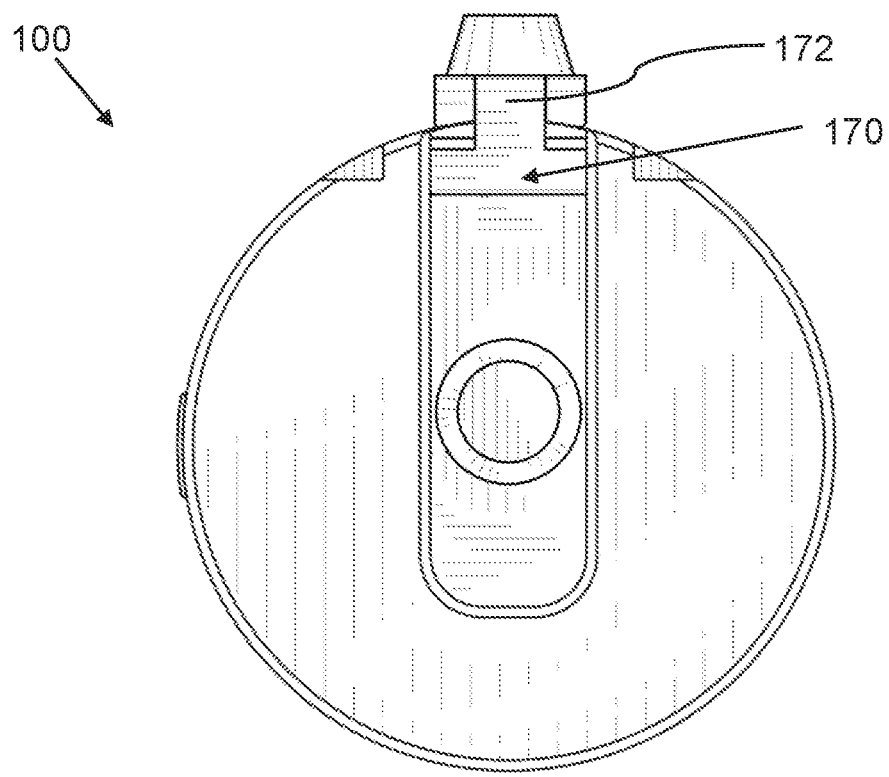
FIG. 2C is a top view of an herb grinder with a dispensing spout in an open configuration, according to an embodiment of the invention.
Figure 2D:
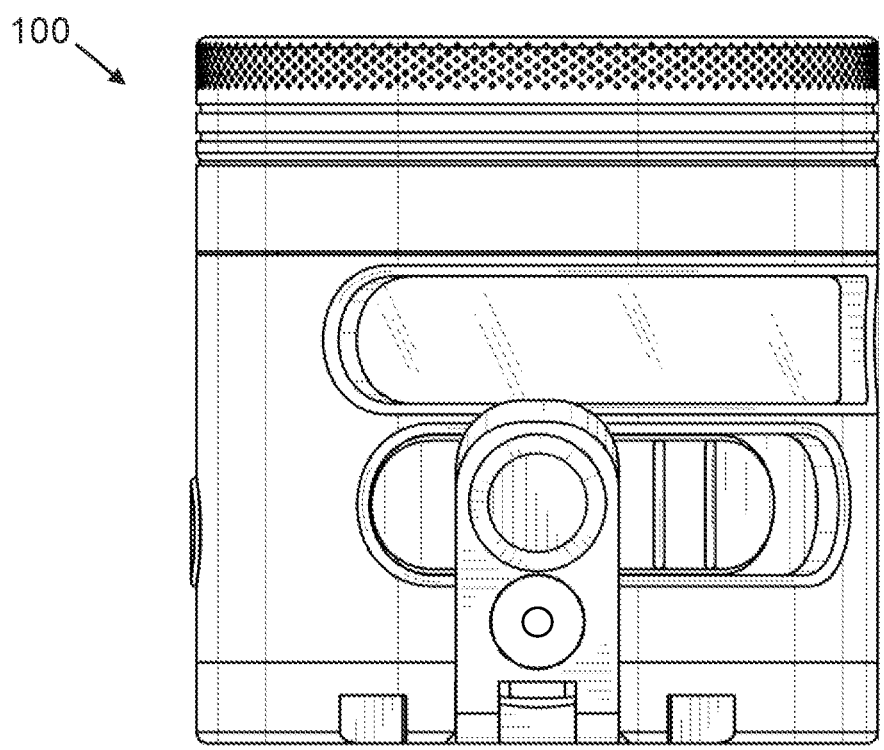
FIG. 2D is a bottom view of an herb grinder with a dispensing spout in an open configuration, according to an embodiment of the invention.
Figure 2E:
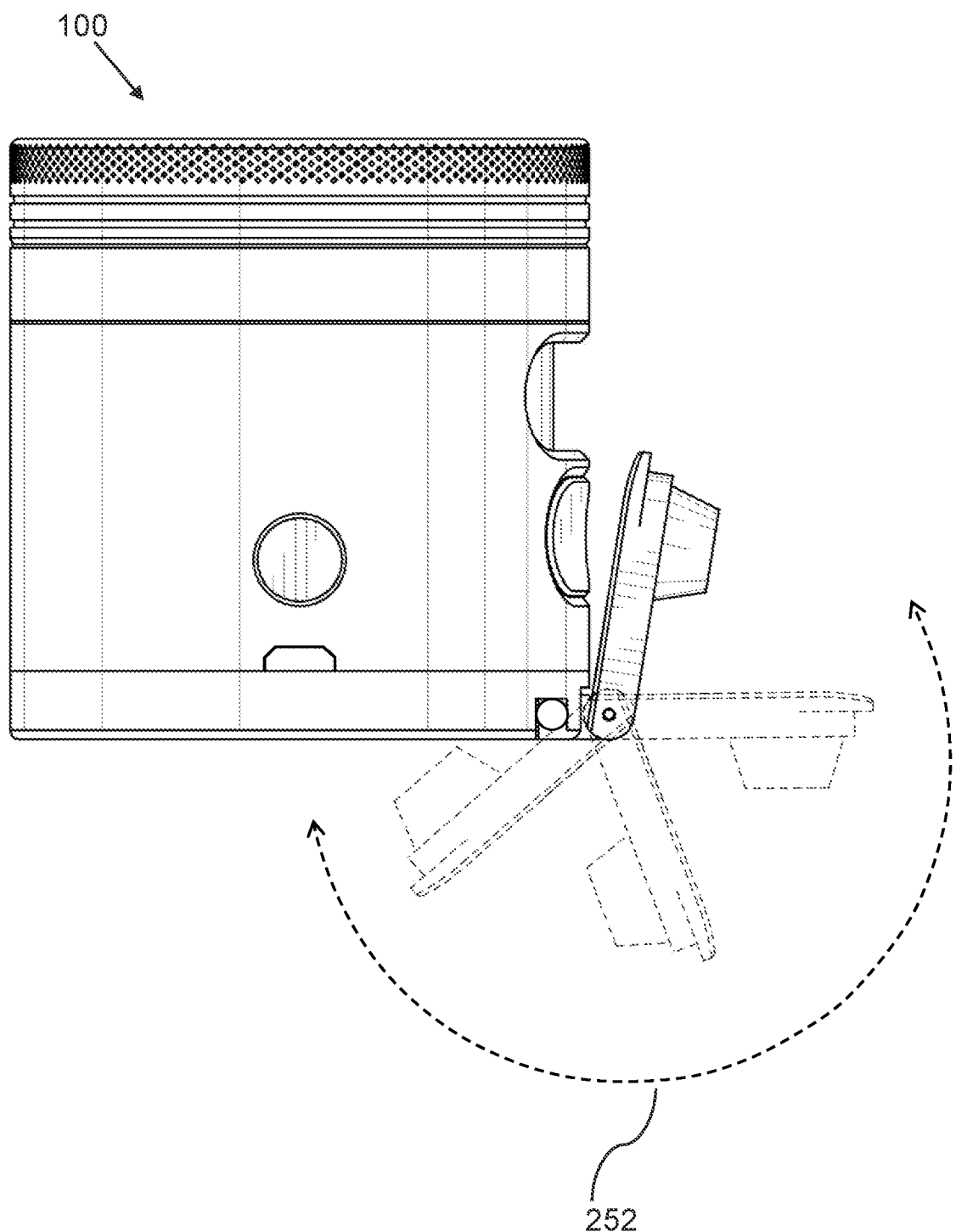
FIG. 2E is a side view of an herb grinder with a dispensing spout in a partially open configuration, according to an embodiment of the invention
Figure 4:
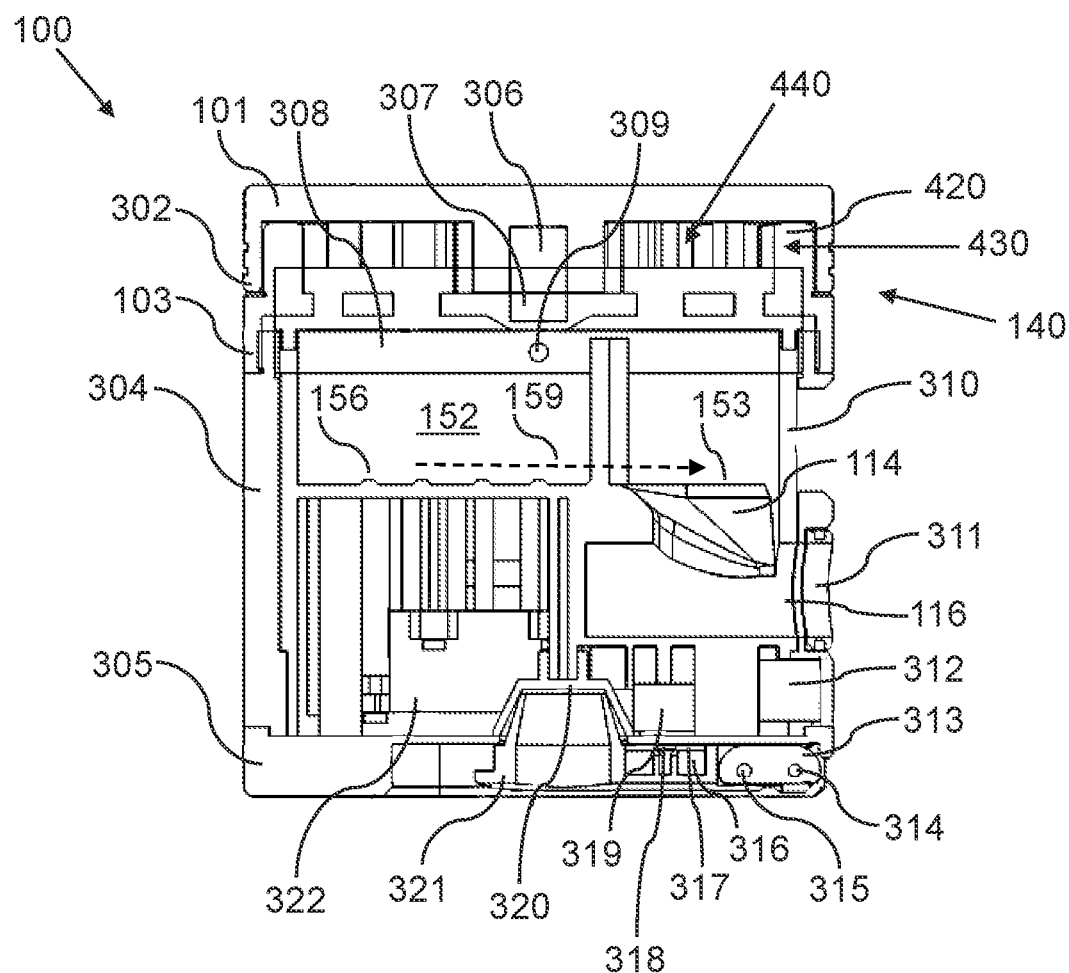
FIG. 4 is a cross-sectional side view of an herb grinder, according to an embodiment of the invention.
Figure 5A:
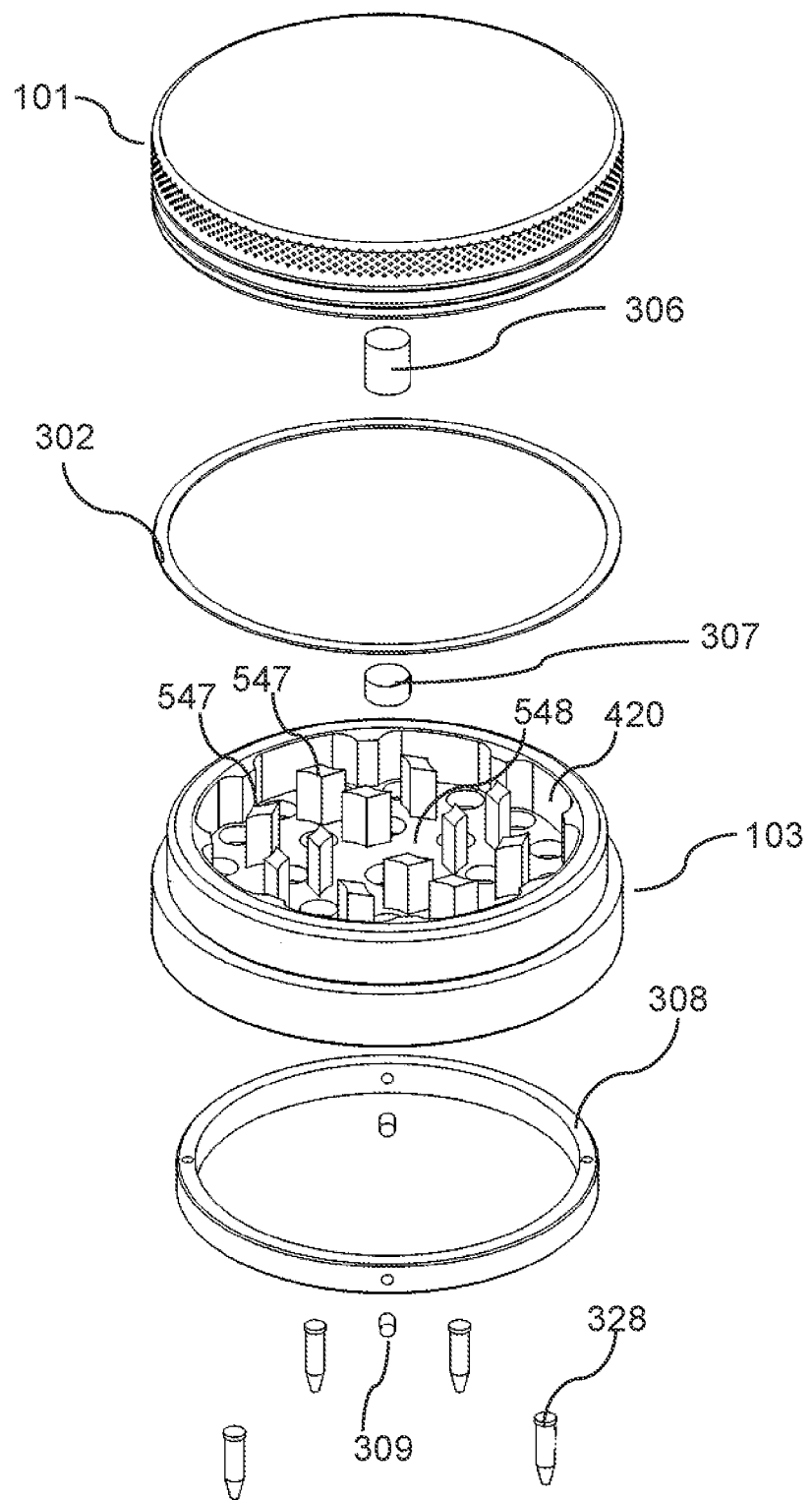
FIG. 5A is an exploded top perspective view of a first set of parts of an herb grinder, according to an embodiment of the invention.
Figure 5B:
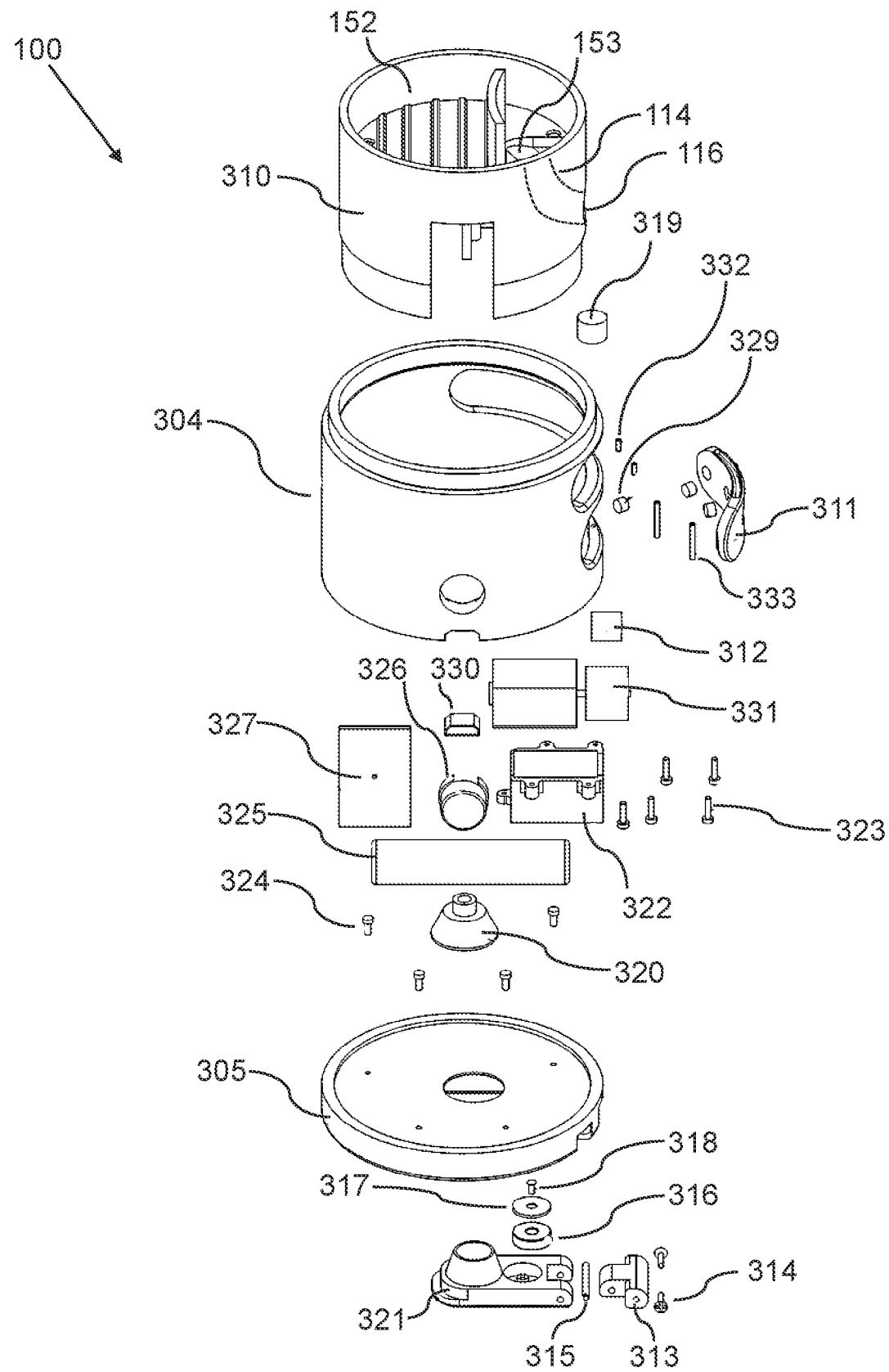
FIG. 5B is an exploded top right perspective view of a second set of parts of an herb grinder, according to an embodiment of the invention.
Figure 5C:
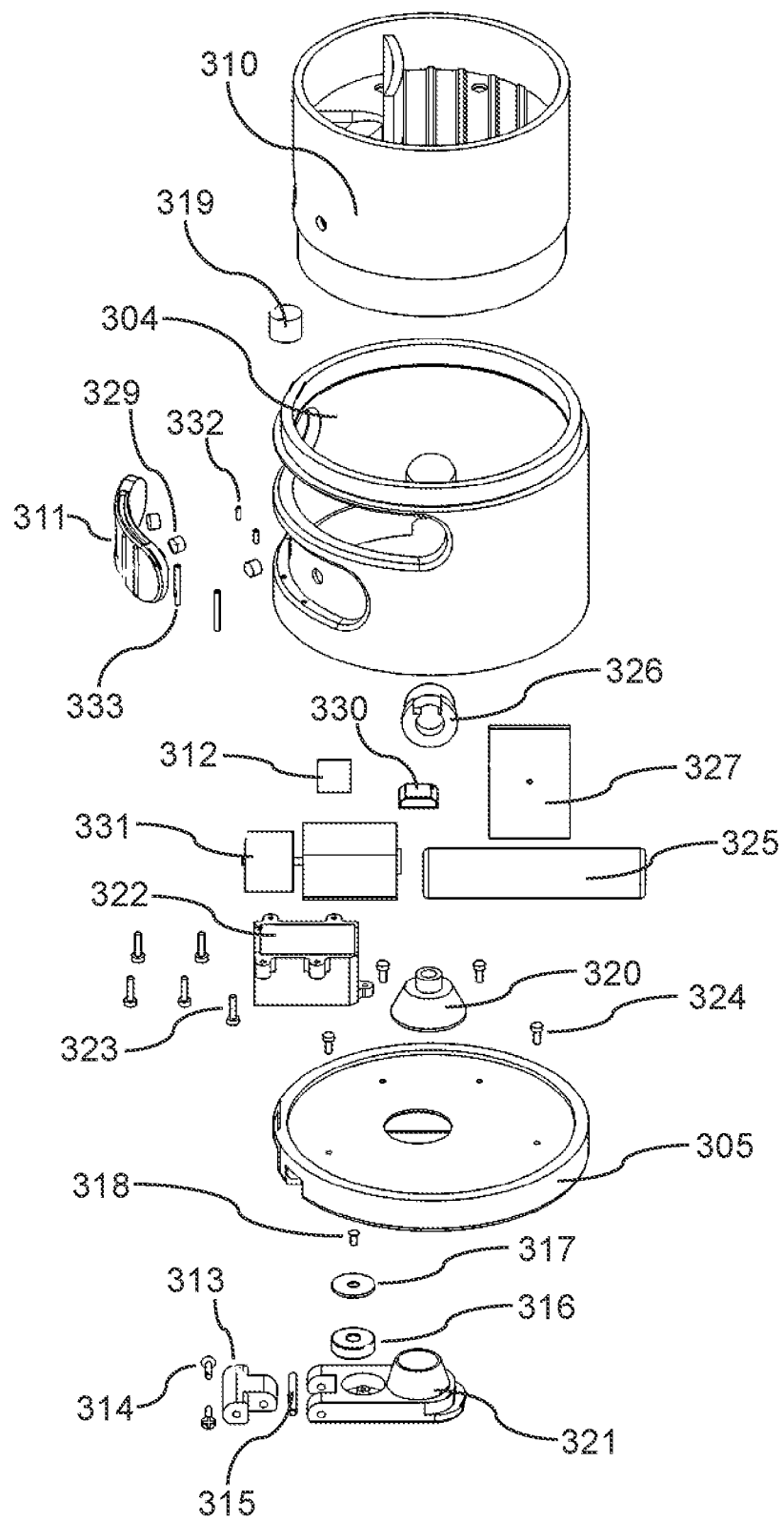
FIG. 5C is an exploded top left perspective view of a second set of parts of an herb grinder, according to an embodiment of the invention.
Figure 6A:
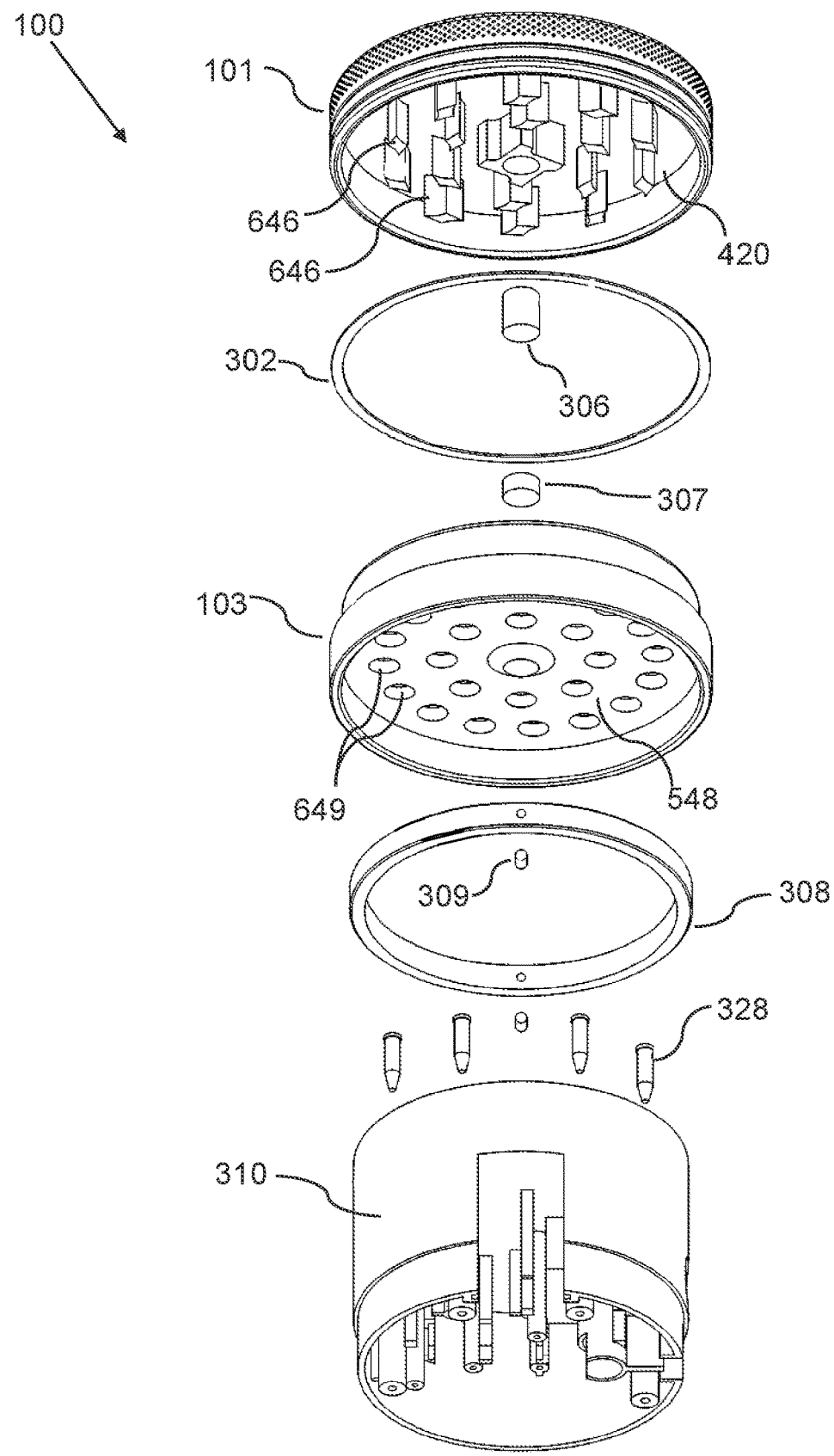
FIG. 6A is an exploded bottom perspective view of a first set of parts of an herb grinder, according to an embodiment of the invention.
Figure 6B:
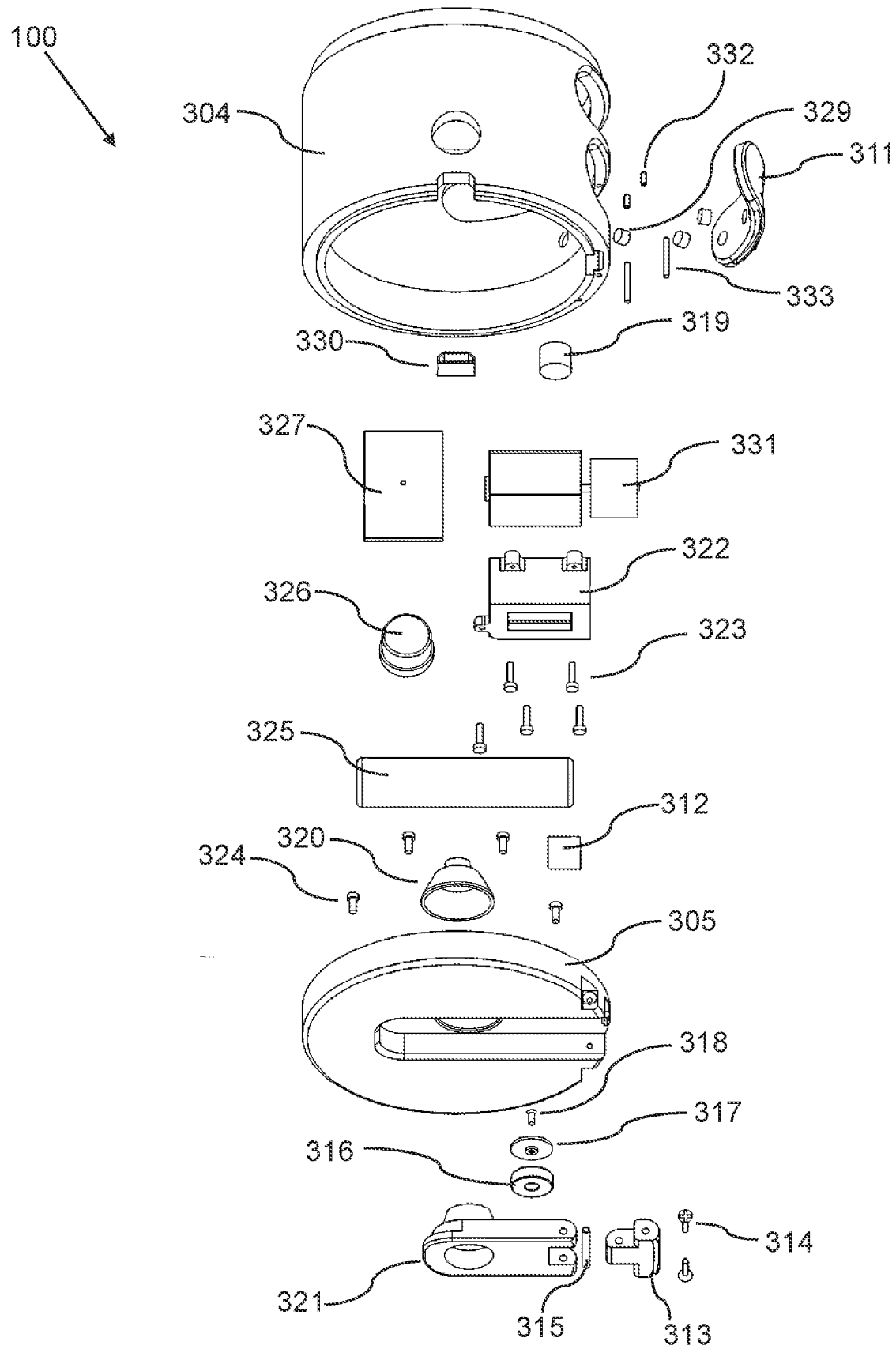
FIG. 6B is an exploded bottom right perspective view of a second set of parts of an herb grinder, according to an embodiment of the invention.

In an embodiment, as shown in FIGS. 1A-1D, 2A-2D, and 3, an herb grinder 100 can include:

a) A cutting section 140, which can include:
   i. a top cutting part 101; and
   ii. a bottom cutting part 103;
   such that the top cutting part 101 can be configured to be detachably and rotatably mounted on the bottom cutting part 103, for example such that the top cutting part 101 slides on to the bottom cutting part 103;
   such that an herb material 180 can be inserted (i.e. is insertable) in an interior of the bottom cutting part, when the top cutting part 101 is removed, as shown in FIG. 1B;
   such that the top cutting part 101 is configured to be rotatable 142 when mounted on the bottom cutting part 103, as shown in FIG. 1A;
   such that combined interlocking blades 440 of the cutting section 140, comprising top interlocking blades 646 and bottom interlocking blades 547 of respectively the top cutting part 101 and the bottom cutting part 103, as shown in FIGS. 5A and 6A, are configured to cut the herb material 180 into herb cuttings 180, when the top cutting part 101 is rotated 142, for example by sequentially repetitive clockwise and counterclockwise rotation 142;
   wherein the bottom cutting part 103 comprises a floor 548, such that the bottom interlocking blades 547 are mounted on an upper surface of the floor 548, wherein the floor 548 comprises apertures 649, such that the herb cuttings 180 fall through the apertures 649 when the herb material 180 is cut;
  b) a main body 110, which comprises:
   i. a center interior 152, as shown in FIGS. 1B, 4 and 5B;
   ii. an exit canal 114;
   iii. an exit aperture 116, which is positioned on an exterior of the main body 110; and
   iv. a receiving indentation 220 on a bottom of the main body 110, wherein the receiving indentation 220 comprises a spout indentation 221;
   such that the exit canal 114 connects the center interior 152 with the exit aperture 116;
   such that the herb cuttings 180 pass through the apertures 649 of the bottom cutting part and into the center interior 152, such that the herb cuttings 180 pass through the exit canal 114 and exit via the exit aperture 116;
  c) an exit lid 111, which can be slidable, such that the lid is configured to open and close the exit aperture 116; and
  d) a rotatable dispensing spout assembly 150, which comprises:
   i. a dispensing arm 121, which is hingedly connected to a lower end of a main body 110 of the herb grinder 100; and
   ii. a dispensing spout 222, which is connected to an outer end of the dispensing arm 121, wherein the dispensing spout 222 has a spout aperture 223, which protrudes through the dispensing spout 222;

wherein the rotatable dispensing spout assembly 150 is configured to be rotatable 252 to a closed position, along a bottom of the main body 110, as shown in FIGS. 1C and 2E, wherein the rotatable dispensing spout assembly 150 fits into a receiving indentation 220 on a bottom of a main body 110 of the herb grinder 100, as shown in FIG. 2B, wherein the exit lid can be closed to avoid spillage of herb cuttings 180 in the center interior 152;

wherein the rotatable dispensing spout assembly 150 is configured to be rotatable 252 to an open position, as shown in FIGS. 2B and 2E, wherein the dispensing arm 121 is rotated 252 to a vertical position aligned with a vertical side of the main body 110 of the herb grinder 100, such that the spout aperture 223 is aligned with the exit aperture 116, such that the herb cuttings 180 pass from the exit aperture 116 through the spout aperture 223 and exit the herb grinder 100.

In a related embodiment, as shown in FIG. 1A, the exit lid can further include a lid aperture 126, such that the exit lid 111 can be slidable to an open position wherein the lid aperture 126 is aligned with the exit aperture 116; and such that the exit lid can be slidable to a closed position wherein the lid aperture 126 is not aligned with the exit aperture 116, such that the exit lid 111 closes the exit aperture 116. In other related embodiments, the exit lid 111 can have a variety of shapes and orientations, and can for example be implemented as a rotatable band, which extends around an entire periphery of the main body.

In an alternative embodiment, which does not require a rotatable dispensing spout assembly 150, the dispensing spout 222 can be a pull-out spout (also called a "sports cap", such as for example commonly used for some sports drink or water bottles), which includes a push pull closure/valve, such that the dispensing spout 222 is closed when the spotted is pressed in, and open when the dispensing spout 222 is pulled out.

In a related embodiment, the receiving indentation 220 can further include a spout indentation 221, which is configured to receive the dispensing spout 222, when the dispensing arm 121 is rotated into the closed position and inserted into the receiving indentation 220.

In a related embodiment, the rotatable dispensing spout assembly 150 can further include a rotatable hinge element 170, which includes a protruding arm 172, such that an inner end of the rotatable hinge element 170 is hingedly connected to the lower end of a main body 110, in an outer end of the receiving indentation; and such that an outer end of the protruding arm is hingedly connected to an inner end of the dispensing arm 121; whereby the dispensing arm 121 is connected to the main body via two hinges;

such that when the rotatable dispensing spout assembly 150 is rotated 252 to the closed position, the protruding arm 172 is oriented horizontally inward, such that the rotatable dispensing spout assembly 150 lies flat along the receiving indentation and flush with a bottom of the main body 110, as shown in FIG. 1C; and such that when the rotatable dispensing spout assembly 150 is rotated 252 to the open position, the protruding arm 172 is oriented horizontally outward and protrudes past a side periphery of the main body 110, such that the dispensing arm 121 lies flat along the vertical side of the main body 110, as shown in FIG. 2B.

In a related embodiment, the herb grinder 100 can further include a vibration button 326 and a dispensing vibrator 331, which can be mounted under the center interior 152, such that the vibration button 326 is connected (directly or indirectly) to the dispensing vibrator 331, such that the pressing the vibration button 326 starts a dispensing vibration of the dispensing vibrator 331, which vibrates the herb grinder 100, such that the dispensing vibration aids a flow of herb cuttings 180 from the cutting chamber 420 via the apertures into the center interior 152 and via an entry aperture 153 to the exit canal 114 through the exit canal 114, such that the herb cuttings 180 exits via the exit canal 114, the exit aperture 116 and the spout aperture 223.

In a related embodiment, FIG. 1B, shows a main body 110 of the herb grinder 100, with the cutting section 140 removed, such that the center interior 152 is visible.

In a related embodiment, as shown in FIG. 1B, the herb grinder 100 can further include a flow blocker 154, which is mounted on a floor 158 of the center interior 152 which is situated around an inner side of the entry aperture 153, which is positioned adjacent to a peripheral wall of the center interior 152, such that the flow blocker 154 serves to direct a flow 155 of the herb cuttings 180 around first and second sides 192, 194 of the flow blocker 154, whereby the flow blocker 154 prevents clogging of the herb cuttings 180 at the entry aperture 153.

In a further related embodiment, as shown in FIG. 1B, the flow blocker 154 can have a convex outer shape, along a lateral direction 157 (similar to direction of the center front tangent line 157), such that the flow blocker is shaped as a segment of a pipe, such that the convex outer shape guides the flow 155 of the herb cuttings 180 to the first and second sides 192, 194 of the flow blocker 154.

In a related embodiment, as shown in FIGS. 1B and 4, the herb grinder 100 can further include a plurality of traversal ridges 156 (which can also be referred to as lateral ridges 156), which are mounted on the floor 158 of the center interior 152, on the inner side of the flow blocker 154, such that the traversal ridges 156 are substantially parallel to a lateral direction 157 of the center interior 152, such that the traversal ridges 156 are substantially perpendicular to an aperture direction 159 from a center 163 of the center interior 152 to the entry aperture 153 of the exit canal 114, such that the traversal ridges 156 are substantially parallel to a center front tangent line 157 of the flow blocker 154;

such that the traversal ridges 156 slow the flow 155 of the herb cuttings 180, whereby the traversal ridges 156 prevent clogging of the herb cuttings 180 at the entry aperture 153.

In another related embodiment, as shown in FIG. 1B, the herb grinder 100 can further include a window 162, which is mounted on a side of the main body 110 of the herb grinder 100, such that the window 162 provides visibility to the center interior 152.

In another related embodiment, as shown in FIG. 1B, the herb grinder 100 can further include a light source 164, which is mounted inside the center interior 152, such that the light source 164 is configured to illuminate the center interior 152, such that the center interior 152 is visible through the window 162. The light source 164 can for example be a light emitting diode.

In a further related embodiment, the light source 164 can be configured to switch on when the vibration button 326 is pressed.

Figure 2F:
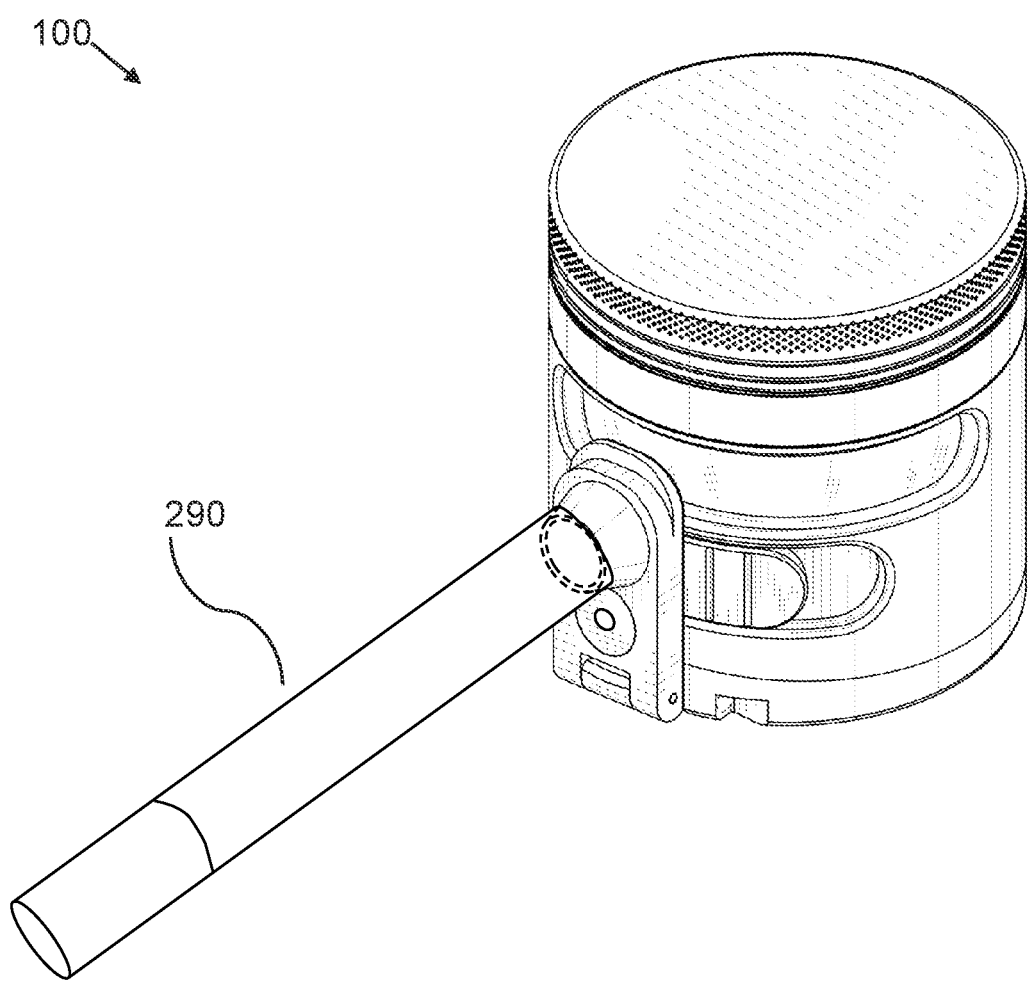
FIG. 2F is a top perspective view of an herb grinder with a dispensing spout in an open configuration and an empty cigarette tube mounted on the dispensing spout, according to an embodiment of the invention.
Figure 3:
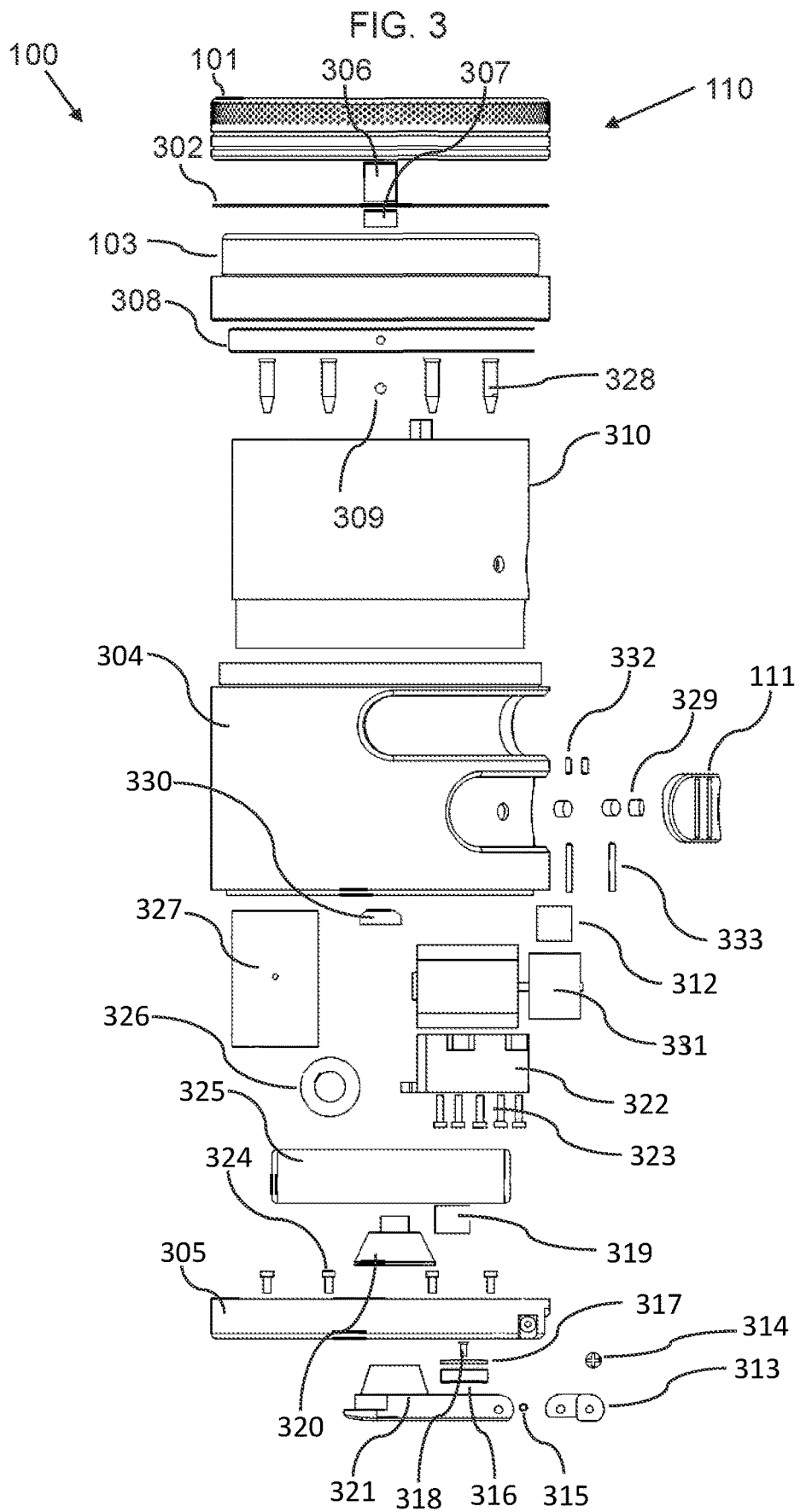
FIG. 3 is an exploded side view of an herb grinder, according to an embodiment of the invention.

In yet another related embodiment, as shown in FIGS. 2A and 2F, an outer side of the dispensing spout 222 can be configured to receive an empty cigarette tube 290, such that the empty cigarette tube 290 can be mounted (i.e. is mountable) on the dispensing spout 222, such that the herb cuttings 180 can be dispensed directly into the empty cigarette tube 290.

In a further related embodiment, as shown in FIG. 2A, the outer side of the dispensing spout 222 can be funnel shaped, such that the dispensing spout 222 narrows toward an outer end of the dispensing spout 222.

In another related embodiment, as shown in FIG. 4, the top cutting part 101 can further include a first magnet 306, and the bottom cutting part 103 can further include a second magnet 307, such that the first magnet 306 is attracted to the second magnet 307, such that the first magnet 306 and the second magnet 307 are configured to ensure that the top cutting part 101 and the bottom cutting part 103 are securely connected, when the top cutting part 101 is mounted on the bottom cutting part 103. Alternatively, either the first or second magnet 306, 307 can be a ferromagnetic part 306, 307, which attracts the opposing second or first magnet 306, 307, respectively.

In another related embodiment, as shown in FIG. 4, the dispensing arm 121 can further include an arm magnet 316; and the main body 110 can further include a bottom magnet 319, which is mounted in a bottom of the main body 110, adjacent to the receiving indentation 220; and side magnet 312, which is mounted in the vertical side of the main body 110;
  wherein the arm magnet 316 is configured to be attracted to the bottom magnet 319, when the dispensing arm 121 is positioned in the receiving indentation 220, whereby the rotatable dispensing spout assembly 150 is securely positionable in the closed position; and
  wherein the arm magnet 316 is configured to be attracted to the side magnet 312, when the dispensing arm 121 is positioned along the vertical side of the main body 110,
  whereby the rotatable dispensing spout assembly 150 is securely positionable in the open position.

Alternatively, one of the arm, bottom, or side magnets 316, 319, 312 can be a ferromagnetic part 316, 319, 312, which attracts the other two magnets 316, 319, 312.

Thus, in an embodiment, an herb grinder 100, can include:
a) a cutting section 140, as shown in FIGS. 1A and 4, comprising:
  a cutting chamber 420, such that an herb material 180 is insertable in the cutting chamber 420; and
  an herb cutter 430, which is configured to cut the herb material 180 in the cutting chamber 420 into herb cuttings 180, wherein the herb cutter 430 for example can comprise top and bottom cutting parts 101, 103, each comprising interlocking cutting blades 440; and
b) a main body 110, which is positioned below the cutting section 140, wherein the main body 110 comprises:
  a center interior 152;
  an exit canal 114;
  an exit aperture 116, which is positioned on an exterior of the main body 110;
  such that the exit canal 114 connects the center interior 152 with the exit aperture 116;
  such that the herb cuttings 180 fall from the cutting chamber 420 into the center interior 152, such that the herb cuttings 180 pass through the exit canal 114 and exit via the exit aperture 116.

In a related embodiment, the herb material 180 can be processed tobacco leaves, cannabis flowers or other cannabis materials, or some other form of smokable plant or herb material.

In a related embodiment, as shown in FIGS. 3, 4, 5A, 5B, 5C, and 6A-6B, the herb grinder 100 can include the following parts:
  a) A top grinder 101 with teeth;
  b) A clear pvc rim 302;
  c) A bottom grinder 103 with teeth;
  d) An exterior shell 304;
  e) A bottom aluminum cover 305;
  f) A top grinder magnet 306;
  g) A bottom grinder magnet 307;
  h) An aluminum body stabilization ring 308;
  i) A Screw 309;
  j) A transparent plastic body internal 310;
  k) A sliding gate 311;
  l) A first flip spout magnet 312;
  m) A flip spout hinge 313;
  n) A spout screw 314;
  o) A flip nail 315;
  p) A second flip spout magnet 316;
  q) A flip spout magnet cover 317;
  r) A flip spout screw 318;
  s) A third flip spout magnet 319;
  t) A flip metal cover 320;
  u) A flip spout 321;
  v) A motor stabilizing cover 322;
  w) motor stabilizing screws 323;
  x) A bottom cover screw 324;
  y) A battery 325;
  z) An operations/vibration button 326;
  aa) A printed circuit board 327;
  bb) Connecting screws 328;
  cc) A sliding gate magnet 329;
  dd) A charger port 330, which can be a USB port 330;
  ee) A dispensing vibrator 331;
  ff) A sliding gate nail (short) 332; and
  gg) A sliding gate nail (long) 333.

Figure 7:
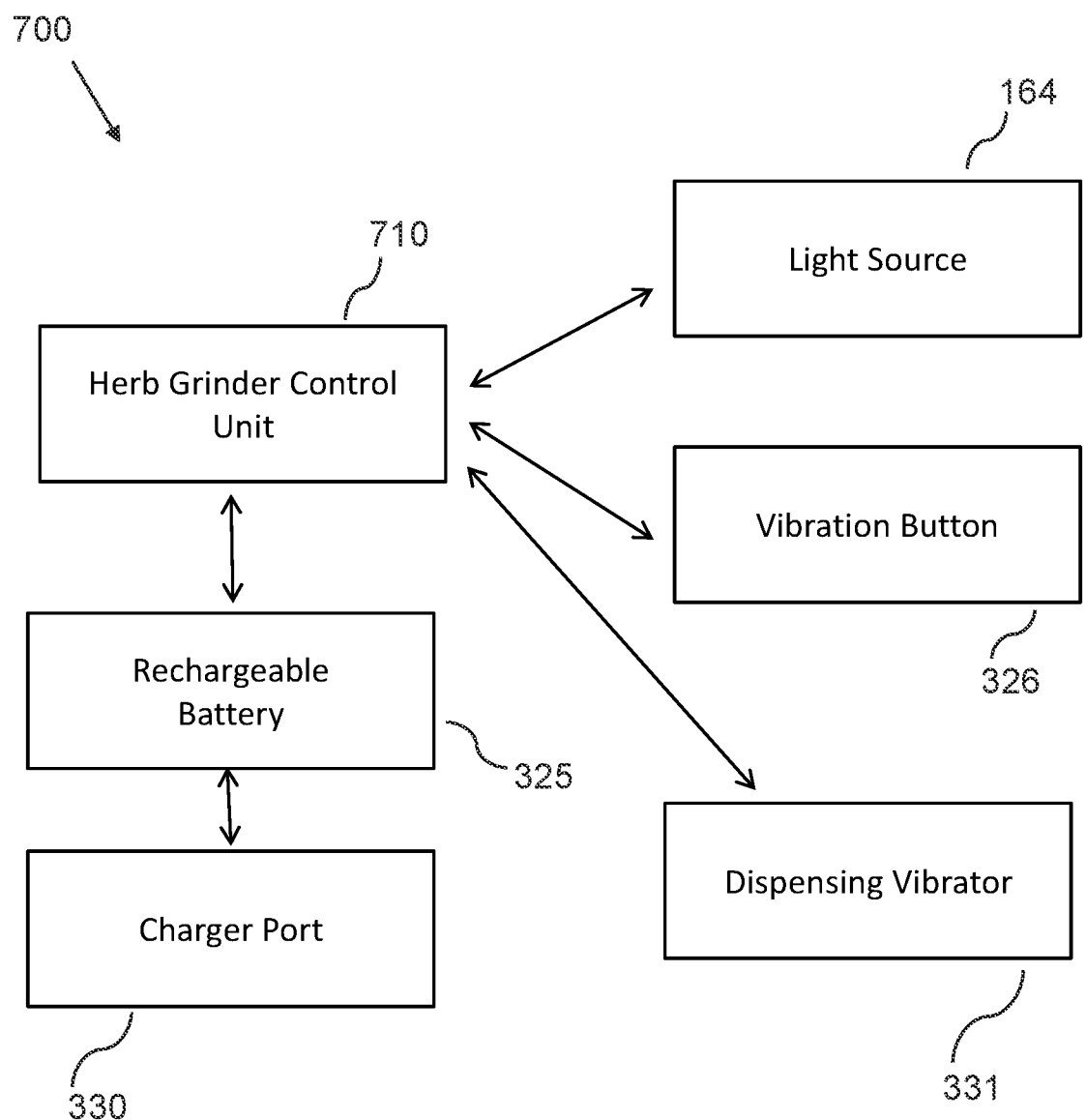
FIG. 7 is a schematic diagram illustrating an herb grinder control system, according to an embodiment of the invention.

In a related embodiment, as shown in FIG. 7, an herb grinder control system 700 can include:
  a) An herb grinder control unit 710;
  b) A Vibration button 326;
  c) A dispensing vibrator 331;
  d) A Light source 164;
  e) A rechargeable battery 325; and
  f) A charging port 330.

In a related embodiment, as shown in FIG. 8, the herb grinder control unit 710 can include:
  a) A processor 802;
  b) A non-transitory memory 804;
  c) An input/output component 806; and
  d) A controller 810, which is configured to control functions of the herb grinder control system 700; all connected via
  e) A data bus 820.

FIGS. 7 and 8 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 7 and 8 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the herb grinder control unit 710 are to be interpreted in the most general manner.

For example, the processor 802 can include a single physical microprocessor or a microcontroller.

In a further example, the non-transitory memory 804 can include various forms of non-transitory storage media, including random access memory and other forms of dynamic storage, and hard disks. Similarly, the input/output 806 can each respectively include a plurality of well-known input/output devices, such as screens, keyboards, pointing devices, motion trackers, communication ports, and so forth.

Furthermore, it shall be understood that the herb grinder control unit 710 can include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the herb grinder control unit 710 communicates with external mobile devices over a network, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the herb grinder 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. An herb grinder, comprising:
   a) a cutting section, comprising:
   a cutting chamber, such that an herb material is insertable in the cutting chamber; and
   an herb cutter, which is configured to cut the herb material in the cutting chamber into herb cuttings; and b) a main body, which is positioned below the cutting section, wherein the main body comprises:
   a center interior;
   an exit canal;
   an exit aperture, which is positioned on an exterior of the main body; and
   a plurality of traversal ridges, which are mounted on a floor of the center interior, such that the traversal ridges are perpendicular to a direction from the center interior to an entry aperture of the exit canal;
   such that the traversal ridges slow a flow of the herb cuttings, whereby the traversal ridges prevent clogging of the herb cuttings at the entry aperture of the exit canal;
   such that the exit canal connects the center interior with the exit aperture; and
   such that the herb cuttings fall from the cutting chamber into the center interior, such that the herb cuttings pass through the exit canal and exit via the exit aperture;
c) a window, which is mounted on a side of the main body of the herb grinder, such that the window provides visibility to the center interior;
d) a light source, which is mounted inside the center interior, such that the light source is configured to illuminate the center interior, such that the center interior is visible through the window;
e) a dispensing vibrator, which is mounted under the center interior, such that the dispensing vibrator is configured to produce a dispensing vibration of the herb grinder, such that the dispensing vibration aids a flow of herb cuttings from the cutting chamber; and
f) a vibration button, such that pressing the vibration button starts the dispensing vibration of the dispensing vibrator;
wherein the light source is configured to switch on when the vibration button is pressed.

2. The herb grinder of claim 1, further comprising:
an exit lid, which is configured to open and close the exit aperture.

3. The herb grinder of claim 2, wherein the exit lid is configured to be slidable.

4. The herb grinder of claim 1, wherein the main body further comprises a receiving indentation on a bottom of the main body; and
wherein the herb grinder further comprises:
   a rotatable dispensing spout assembly, which comprises:
      a dispensing arm, which is hingedly connected to a lower end of the main body of the herb grinder; and
      a dispensing spout, which is connected to an outer end of the dispensing arm, wherein the dispensing spout comprises a spout aperture, which protrudes through the dispensing spout;
   wherein the rotatable dispensing spout assembly is configured to be rotatable to a closed position, wherein the rotatable dispensing spout assembly fits into the receiving indentation;
   wherein the rotatable dispensing spout assembly is configured to be rotatable to an open position, wherein the dispensing arm is rotated to a vertical position aligned with a vertical side of the main body of the herb grinder, such that the spout aperture is aligned with the exit aperture, such that the herb cuttings pass from the exit aperture through the spout aperture and exit the herb grinder.

5. The herb grinder of claim 4, wherein the rotatable dispensing spout assembly further comprises:
a rotatable hinge element, which includes a protruding arm,
   such that an inner end of the rotatable hinge element is hingedly connected to the lower end of the main body, in an outer end of the receiving indentation; and
   such that an outer end of the protruding arm is hingedly connected to an inner end of the dispensing arm;
such that when the rotatable dispensing spout assembly is rotated to the closed position, the protruding arm is oriented horizontally inward,
such that the rotatable dispensing spout assembly lies flat along the receiving indentation and flush with a bottom of the main body; and
such that when the rotatable dispensing spout assembly is rotated to the open position, the protruding arm is oriented horizontally outward and protrudes past a side periphery of the main body,
such that the dispensing arm lies flat along the vertical side of the main body.

6. The herb grinder of claim 4, wherein the receiving indentation further comprises:
a spout indentation, which is configured to receive the dispensing spout, when the dispensing arm is rotated into the closed position and inserted into the receiving indentation.

7. The herb grinder of claim 4, wherein an outer side of the dispensing spout is configured to receive an empty cigarette tube, such that the empty cigarette tube is mountable on the dispensing spout, such that the herb cuttings are dispensed directly into the empty cigarette tube.

8. The herb grinder of claim 7, wherein the outer side of the dispensing spout is funnel shaped, such that the dispensing spout narrows toward an outer end of the dispensing spout.

9. The herb grinder of claim 1, further comprising
a dispensing vibrator, which is mounted under the center interior, such that the dispensing vibrator is configured to produce a dispensing vibration, which vibrates the herb grinder, such that the dispensing vibration aids a flow of herb cuttings from the cutting chamber.

10. The herb grinder of claim 9, further comprising:
a vibration button, such that pressing the vibration button starts the dispensing vibration of the dispensing vibrator.

11. The herb grinder of claim 1, further comprising:
a flow blocker, which is mounted on a floor of the center interior, such that the flow blocker is positioned around an inner side of an entry aperture of the exit canal, which is positioned adjacent to a peripheral wall of the center interior,
   such that the flow blocker serves to direct a flow of the herb cuttings around first and second sides of the flow blocker, whereby the flow blocker prevents clogging of the herb cuttings at the entry aperture of the exit canal.

12. The herb grinder of claim 1, wherein the light source is a light emitting diode.

13. The herb grinder of claim 1, wherein the cutting section further comprises a top cutting part and a bottom cutting part; wherein the top cutting part comprises a first magnet and the bottom cutting part comprises a second magnet, such that the first magnet is configured to attract to the second magnet, such that the first magnet and the second magnet are configured to ensure that the top cutting part and the bottom cutting part are securely connected, when the top cutting part is mounted on the bottom cutting part.

14. The herb grinder of claim 4, wherein the dispensing arm further comprises an arm magnet; and the main body further comprises a bottom magnet, which is mounted in a bottom of the main body, adjacent to the receiving indentation; and a side magnet, which is mounted in the vertical side of the main body;
- wherein the arm magnet is configured to be attracted to the bottom magnet, when the dispensing arm is positioned in the receiving indentation, whereby the rotatable dispensing spout assembly is securely positionable in the closed position; and
- wherein the arm magnet is configured to be attracted to the side magnet, when the dispensing arm is positioned along the vertical side of the main body, whereby the rotatable dispensing spout assembly is securely positionable in the open position.

15. An herb grinder, comprising:
a) a cutting section, comprising:
  - a cutting chamber, such that an herb material is insertable in the cutting chamber; and
  - an herb cutter, which is configured to cut the herb material in the cutting chamber into herb cuttings; and
b) a main body, which is positioned below the cutting section, wherein the main body comprises:
  - a center interior;
  - an exit canal;
  - an exit aperture, which is positioned on an exterior of the main body; and
  - a flow blocker, which is mounted on a floor of the center interior, such that the flow blocker is positioned around an inner side of an entry aperture of the exit canal, which is positioned adjacent to a peripheral wall of the center interior,
    - such that the flow blocker serves to direct a flow of the herb cuttings around first and second sides of the flow blocker, whereby the flow blocker prevents clogging of the herb cuttings at the exit aperture;
  - such that the exit canal connects the center interior with the exit aperture; and
  - such that the herb cuttings fall from the cutting chamber into the center interior, such that the herb cuttings pass through the exit canal and exit via the exit aperture;
c) a window, which is mounted on a side of the main body of the herb grinder, such that the window provides visibility to the center interior;
d) a light source, which is mounted inside the center interior, such that the light source is configured to illuminate the center interior, such that the center interior is visible through the window;
e) a dispensing vibrator, which is mounted under the center interior, such that the dispensing vibrator is configured to produce a dispensing vibration of the herb grinder, such that the dispensing vibration aids a flow of herb cuttings from the cutting chamber; and
f) a vibration button, such that pressing the vibration button starts the dispensing vibration of the dispensing vibrator;

wherein the light source is configured to switch on when the vibration button is pressed.

16. The herb grinder of claim 15, further comprising:
a rotatable dispensing spout assembly, which comprises:
  - a dispensing arm, which is hingedly connected to a lower end of the main body of the herb grinder;
  - a dispensing spout, which is connected to an outer end of the dispensing arm, wherein the dispensing spout comprises a spout aperture;
  - wherein the rotatable dispensing spout assembly is configured to be rotatable to a closed position, along a bottom of the main body; and
  - wherein the rotatable dispensing spout assembly is configured to be rotatable to an open position, wherein the dispensing arm is rotated to a vertical position aligned with a vertical side of the main body of the herb grinder, such that the spout aperture is aligned with the exit aperture, such that the herb cuttings pass through the spout aperture and exit the herb grinder.

17. The herb grinder of claim 16, wherein the main body further comprises:
a receiving indentation on the bottom of the main body;
wherein the rotatable dispensing spout assembly fits into the receiving indentation, when the rotatable dispensing spout assembly is rotated to the open position.

18. An herb grinder, comprising:
a) a cutting section, comprising:
  - a cutting chamber, such that an herb material is insertable in the cutting chamber; and
  - an herb cutter, which is configured to cut the herb material in the cutting chamber into herb cuttings; and
b) a main body, which is positioned below the cutting section, wherein the main body comprises:
  - a center interior;
  - an exit canal;
  - an exit aperture, which is positioned on an exterior of the main body; and
  - such that the exit canal connects the center interior with the exit aperture; and
  - such that the herb cuttings fall from the cutting chamber into the center interior, such that the herb cuttings pass through the exit canal and exit via the exit aperture;
c) a window, which is mounted on a side of the main body of the herb grinder, such that the window provides visibility to the center interior;
d) a light source, which is mounted inside the center interior, such that the light source is configured to illuminate the center interior, such that the center interior is visible through the window;
e) a dispensing vibrator, which is mounted under the center interior, such that the dispensing vibrator is configured to produce a dispensing vibration of the herb grinder, such that the dispensing vibration aids a flow of herb cuttings from the cutting chamber; and
f) a vibration button, such that pressing the vibration button starts the dispensing vibration of the dispensing vibrator;
wherein the light source is configured to switch on when the vibration button is pressed.

* * * * *